(12) United States Patent
Choi et al.

(10) Patent No.: US 12,455,222 B2
(45) Date of Patent: Oct. 28, 2025

(54) SENSOR DEVICE AND OPERATING METHOD THEREOF

(71) Applicant: SAMSUNG ELECTRONICS CO., LTD., Suwon-si (KR)

(72) Inventors: Kwang Wook Choi, Suwon-si (KR); Iihwan Kim, Suwon-si (KR); Seokwhan Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 422 days.

(21) Appl. No.: 18/112,241

(22) Filed: Feb. 21, 2023

(65) Prior Publication Data

US 2024/0068922 A1 Feb. 29, 2024

(30) Foreign Application Priority Data

Aug. 26, 2022 (KR) .................. 10-2022-0107909

(51) Int. Cl.
*G01N 15/06* (2024.01)
*G01N 15/00* (2006.01)

(52) U.S. Cl.
CPC . *G01N 15/0637* (2013.01); *G01N 2015/0046* (2013.01)

(58) Field of Classification Search
CPC ....... G01N 15/0637; G01N 2015/0046; G01N 29/4436; G01N 2291/0255; G01N 2291/0256; G01N 2291/0423; G01N 2291/0426; G01N 2291/0427; G01N 29/036; G01N 29/022; G01N 29/12; G01N 29/2437; G01N 29/2462; G01N 29/36;

(Continued)

(56) References Cited

U.S. PATENT DOCUMENTS 7,836,751 B2 11/2010 Marra
8,806,915 B2 8/2014 White et al.
(Continued)

FOREIGN PATENT DOCUMENTS

CN 110231263 A 9/2019
JP 2010117184 A * 5/2010
(Continued)

OTHER PUBLICATIONS

Eunsuk Choi et al., "Self-Refreshing Characteristics of an Airborne Particle Sensor Using a Bridged Paddle Oscillator", Journal of the Korean Physical Society, vol. 68, No. 10, May 2016, pp. 1170-1175, DOI: 10.3938/jkps.68.1170.

(Continued)

*Primary Examiner* — Francis C Gray
(74) *Attorney, Agent, or Firm* — Sughrue Mion, PLLC

(57) ABSTRACT

A sensor device includes: a support structure having a cantilever shape extending in a first direction and having a first end fixed; a sensing element having a surface and a resonant frequency changing according to contaminants adsorbed to the surface and disposed at a second end of the support structure; a frequency detector configured to detect the resonant frequency of the sensing element; and an actuator disposed at the one end of the support structure and configured to move the support structure so that the second end of the support structure moves in a second direction perpendicular to the first direction.

20 Claims, 14 Drawing Sheets

(58) Field of Classification Search
CPC . G01N 29/4409; G01N 2291/014; B08B 7/02
See application file for complete search history.

(56) References Cited

U.S. PATENT DOCUMENTS

| | | | |
|---|---|---|---|
| 10,804,877 | B2 | 10/2020 | Ruby et al. |
| 11,237,090 | B2* | 2/2022 | Schneider ........... B81C 1/00182 |
| 2005/0097962 | A1 | 5/2005 | Lee et al. |
| 2010/0107736 | A1* | 5/2010 | Lu .......................... G01G 3/165 |
| | | | 73/24.06 |
| 2012/0094270 | A1* | 4/2012 | Mutharasan ........... G01H 11/08 |
| | | | 435/7.1 |
| 2015/0355084 | A1 | 12/2015 | White |
| 2017/0097255 | A1* | 4/2017 | Karakaya ............ G01N 33/0062 |
| 2018/0221921 | A1 | 8/2018 | Magee et al. |
| 2020/0319082 | A1 | 10/2020 | Mutlu et al. |
| 2021/0255082 | A1* | 8/2021 | Sethi .................. G01N 15/0272 |
| 2023/0056602 | A1 | 2/2023 | Kim et al. |

FOREIGN PATENT DOCUMENTS

| | | |
|---|---|---|
| KR | 10-2005-0045728 A | 5/2005 |
| KR | 10-1747742 B1 | 6/2017 |
| KR | 10-2023-0027634 A | 2/2023 |

OTHER PUBLICATIONS

Min-Geon Kim et al., "MEMS PZT Oscillating Platform for Fine Dust Particle Removal at Resonance", International Journal of Precision Engineering and Manufacturing, vol. 19, No. 12, Dec. 2018, pp. 1851-1859, DOI: 10.1007/s12541-018-0214-9.

* cited by examiner

SENSOR DEVICE AND OPERATING METHOD THEREOF

CROSS-REFERENCE TO RELATED APPLICATION

This application is based on and claims priority under 35 U.S.C. § 119 to Korean Patent Application No. 10-2022-0107909, filed on Aug. 26, 2022, in the Korean Intellectual Property Office, the disclosure of which is incorporated by reference herein in its entirety.

BACKGROUND

1. Field

The disclosure relates to a sensor device capable of desorbing contaminants, and an operating method thereof.

2. Description of Related Art

As populations become denser and the number of vehicles increase, interest in airborne fine contaminants is growing. A sensor device is used to detect fine contaminants floating in the air. As a sensing method of sensing fine contaminants, a resonant frequency sensing method of sensing a change in a resonant frequency, a light scattering method of converting an amount of scattered light into an electrical signal, a gas sensing method, a β-ray absorption method, and the like are used.

The resonant frequency sensing method is little affected by the particle diameter or type of fine contaminants, and stably measures fine contaminants up to a low concentration with a minimum resolution of 1 μgm$^3$. Therefore, the resonant frequency sensing method is widely used to measure fine contaminants. Sensor devices configured to sense fine contaminants are manufactured based on micro-electro mechanical systems (MEMS) technology. Accordingly, when fine contaminants are sensed, high accuracy may be achieved. However, because it is difficult to remove fine contaminants deposited on the surface of the sensor device, the accuracy of the sensor device can deteriorate and the sensor device may not be used semi-permanently.

SUMMARY

Provided are a sensor device capable of removing fine contaminants attached thereto, and an operating method thereof.

Additional aspects will be set forth in part in the description which follows and, in part, will be apparent from the description, or may be learned by practice of the presented embodiments of the disclosure.

A sensor device according to an embodiment includes: a support structure having a cantilever shape extending in a first direction and having a first end fixed; a sensing element having a surface and having a resonant frequency which changes according to contaminants adsorbed to the surface, the sensing element being disposed at a second end of the support structure opposite to the first end; a frequency detector configured to detect the resonant frequency of the sensing element; and an actuator disposed at the first end of the support structure, wherein the actuator moves the support structure so that the second end of the support structure moves in a second direction perpendicular to the first direction.

The sensing element may include at least one of a film bulk acoustic resonator (FBAR) element, a surface acoustic wave (SAW) element, and a quartz crystal microbalance (QCM) element, a resonant frequency of which changes according to adsorption of the contaminants.

The sensing element may include: a first-first electrode having a flat plate shape; a first-second electrode having a flat plate shape; and a first piezoelectric layer disposed between the first-first electrode and the first-second electrode.

The sensor device may have a sensing area in which the first-first electrode, the first piezoelectric layer, and the first-second electrode are disposed to overlap each other, and the support structure may include a sensing element support having a frame shape having an opening disposed in an area corresponding to the sensing area.

The actuator may include: a second-first electrode supported by an actuator support provided in the support structure; a second-second electrode disposed to face the second-first electrode; and a second piezoelectric layer disposed between the second-first electrode and the second-second electrode.

The first piezoelectric layer and the second piezoelectric layer may be integrally formed as a single body.

The sensor device may further include a power supply configured to apply a voltage to the second-second electrode and the second-first electrode.

The sensor device may further include a controller configured to control the power supply to supply voltage to the second-second electrode and the second-first electrode according to a change in the resonant frequency received from the frequency detector.

The support structure may be a semiconductor substrate including at least one of silicon, germanium, silicon germanium, gallium arsenide, and indium phosphide.

A sensor device according to another embodiment includes: a support structure having a double clamped beam shape extending in a first direction and having a first end and a second end fixed; a sensing element disposed between the first end and the second end of the support structure, the sensing element having a surface and having a resonant frequency changing according to contaminants adsorbed to the surface; a frequency detector configured to detect the resonant frequency of the sensing element; and an actuator disposed at at least one of: the first end and the second end of the support structure and configured to move the support structure so that an area between the first end and the second end of the support structure moves in a second direction perpendicular to the first direction.

The sensing element may include at least one of a film bulk acoustic resonator (FBAR) element, a surface acoustic wave (SAW) element, and a quartz crystal microbalance (QCM) element, a resonant frequency of which changes according to adsorption of the contaminants.

The sensing element may include: a first-first electrode having a flat plate shape; a first-second electrode having a flat plate shape and a first piezoelectric layer disposed between the first-first electrode and the first-second electrode.

The sensor device may have a sensing area in which the first-first electrode, the first piezoelectric layer, and the first-second electrode are disposed to overlap each other, and the support structure may include a sensing element support having a frame shape having an opening disposed in an area corresponding to the sensing area.

The actuator may include a first actuator and a second actuator respectively disposed at the first end and the second end, the first actuator may include: a second-11$^{th}$ electrode supported by a first actuator support provided in the support structure; a second-12$^{th}$ electrode disposed to face the second-11$^{th}$ electrode; and a second-first piezoelectric layer disposed between the second-11$^{th}$ electrode and the second-12$^{th}$ electrode, and the second actuator may include: a second-21$^{st}$ electrode supported by a second actuator support provided in the support structure; a second-22$^{nd}$ electrode disposed to face the second-21$^{st}$ electrode; and a second-second piezoelectric layer disposed between the second-21$^{st}$ electrode and the second-22$^{nd}$ electrode.

The first piezoelectric layer, the second-first piezoelectric layer, and the second-second piezoelectric layer may be integrally formed as a single body.

The actuator may further include a power supply configured to apply voltage to the second-12$^{th}$ electrode, the second-11$^{th}$ electrode, the second-22$^{nd}$ electrode and the second-21$^{st}$ electrode.

The sensor device may further include a controller configured to control the power supply according to a change in the resonant frequency received from the frequency detector.

The support structure may be a semiconductor substrate including at least one of silicon, germanium, silicon germanium, gallium arsenide, and indium phosphide.

An operating method of the sensor device, according to an embodiment, includes: adsorbing the contaminants to the sensing element; detecting resonant frequency of the sensing element; driving the actuator so that the support structure reciprocates in the second direction; and separating the contaminants from the sensing element.

The operating method may further include: re-detecting the resonant frequency of the sensing element; comparing the resonant frequency of the sensing element with an initial resonant frequency: restarting the actuator when the resonant frequency of the sensing element is not at a level of the initial resonant frequency; and re-separating the contaminants from the sensing element when the re-detected resonant frequency has not reached the level of the initial resonant frequency.

BRIEF DESCRIPTION OF THE DRAWINGS

The above and other aspects, features, and advantages of example embodiments will be more apparent from the following description taken in conjunction with the accompanying drawings, in which.

DETAILED DESCRIPTION

Figure 1:
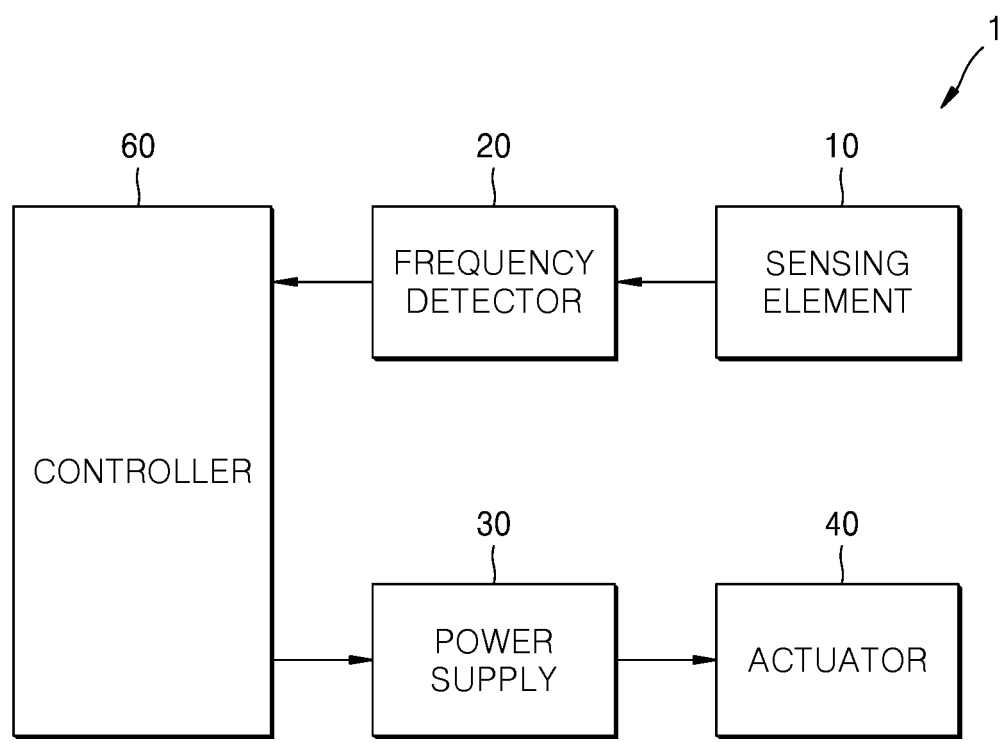
FIG. 1 is a block diagram of a sensor device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described in detail with reference to the accompanying drawings. In the following drawings, the same reference numerals denote the same elements, and the size of each element in the drawings may be exaggerated for clarity and convenience of explanation. Embodiments described herein are merely examples, and various modifications may be made thereto from these embodiments.

Hereinafter, the terms "above" or "on" may include not only those that are directly above, below, left, or right in a contact manner, but also those that are above, below, left, or right in a non-contact manner. The singular forms "a," "an," and "the" as used herein are intended to include the plural forms as well unless the context clearly indicates otherwise. It will be understood that the terms "comprise," "include," or "have" as used herein specify the presence of stated elements, but do not preclude the presence or addition of one or more other elements.

The use of the term "the" and similar demonstratives may correspond to both the singular and the plural. Steps constituting methods may be performed in any suitable order unless otherwise indicated herein or otherwise clearly contradicted by context, and are not necessarily limited to the stated order.

Also, the terms such as " . . . er/or" and "module" described in the specification mean units that process at least one function or operation, and may be implemented as hardware, software, or a combination of hardware and software.

Connecting lines or connecting members illustrated in the drawings are intended to represent exemplary functional relationships and/or physical or logical connections between the various elements. It should be noted that many alternative or additional functional relationships, physical connections or logical connections may be present in a practical device.

The use of all illustrations or illustrative terms in the embodiments is simply to describe the embodiment in detail, and the scope of the present disclosure is not limited due to the illustrations or illustrative terms unless they are limited by claims.

Figure 2:
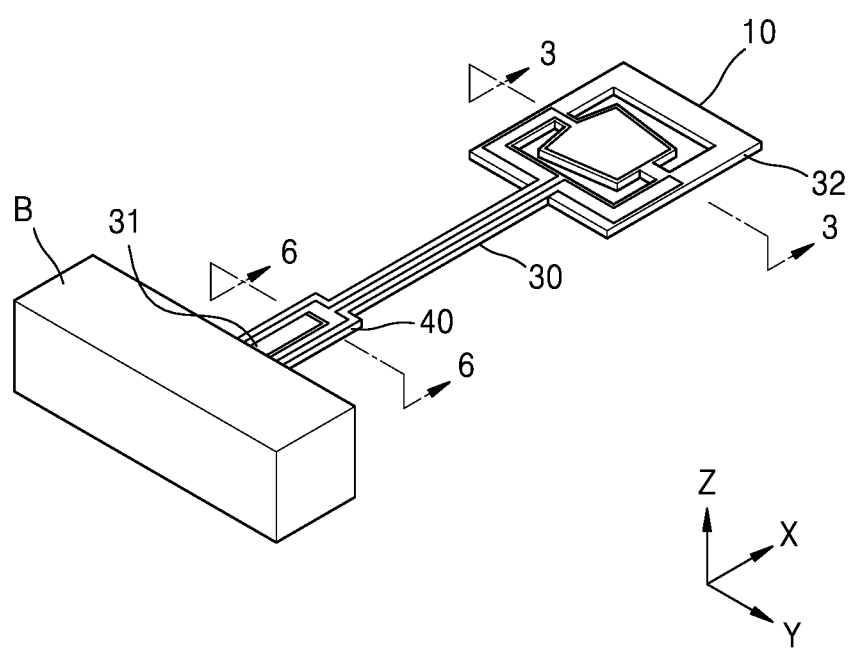
FIG. 2 is a perspective view of a sensor device according to an embodiment.

FIG. 1 is a block diagram of a sensor device 1 according to an embodiment. FIG. 2 is a perspective view of the sensor device 1 according to an embodiment.

Referring to FIGS. 1 and 2, the sensor device 1 according to an embodiment may include a sensing element 10 configured to adsorb and sense contaminants, a frequency detector 20 configured to detect a resonant frequency of the sensing element 10, a support structure 30 configured to support the sensing element 10, an actuator 40 configured to apply a driving force to the support structure 30, a power supply 50 configured to apply a certain voltage to the actuator 40, and a controller 60.

The resonant frequency of the sensing element 10 according to an embodiment may be changed according to whether fine contaminants are desorbed. As an example, the sensing element 10 may be an element that receives power and vibrates at a specific resonant frequency. For example, the sensing element 10 may be a micro-electro mechanical systems (MEMS) element configured to sense fine particles and fine contaminants in a high-frequency region. For example, the sensing element 10 may include at least one of a film bulk acoustic resonator (FBAR) element, a surface acoustic wave (SAW) element, and a quartz crystal microbalance (QCM) element.

Because the sensing element 10 according to an embodiment may use a resonant frequency detecting method of detecting a change in a resonant frequency according to whether fine contaminants are desorbed, there is little influence by the particle diameter or type of fine contaminants, and the sensing element 10 may stably measure fine contaminants up to a low concentration with a minimum resolution of 1 μgm$^3$. However, the sensing element 10 according to an embodiment may be a MEMS element. Accordingly, a method of disassembling the sensor device 1 or replacing the sensing element 10 in order to remove fine contaminants attached to the sensing element 10 may be taken into account. The sensor device 1 according to an embodiment may use the support structure 30 and the actuator 40, which will be described below, to remove fine contaminants attached to the sensing element 10 without replacing the sensing element 10. Hereinafter, an FBAR element is described as an example of the sensing element 10, but the disclosure is not limited thereto.

Figure 3:
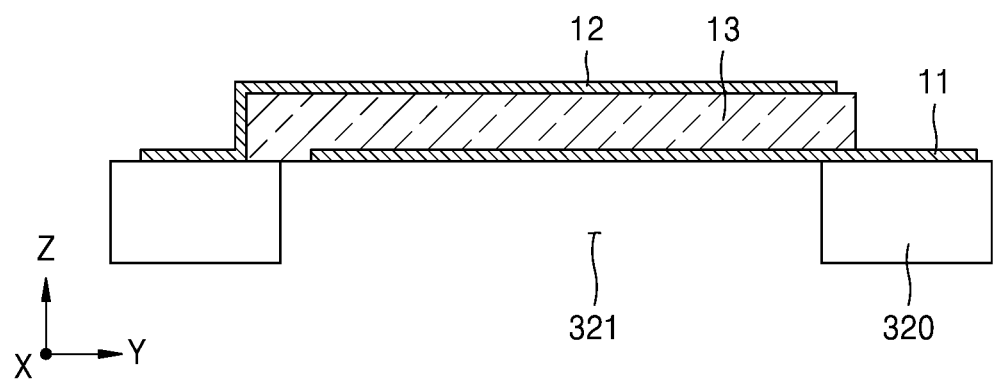
FIG. 3 is a cross-sectional view of the sensor device taken along line 3-3 of FIG. 2.
Figure 4:
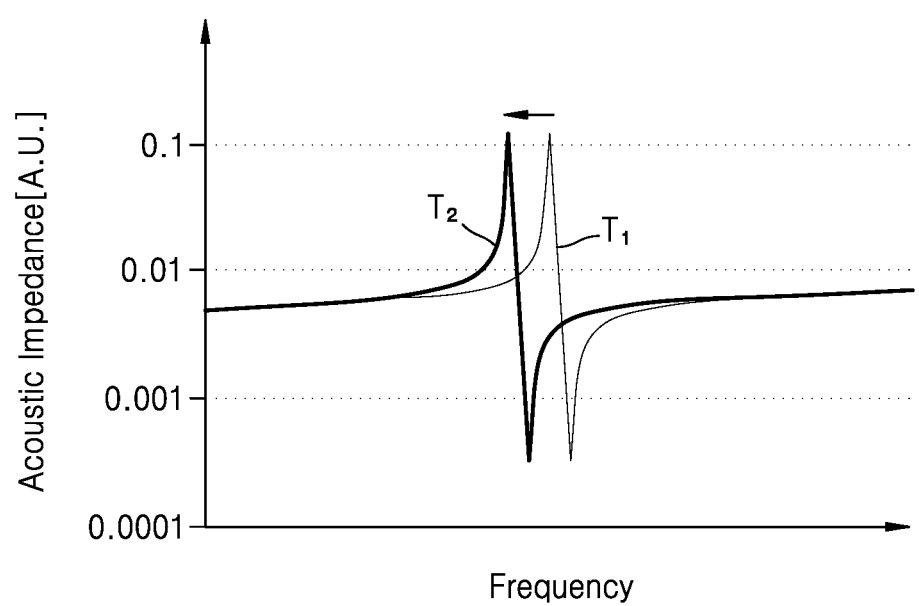
FIG. 4 is a graph showing a change in a resonant frequency in a sensing element according to an embodiment.

FIG. 3 is a cross-sectional view of the sensor device 1 taken along line 3-3 of FIG. 2. FIG. 4 is a graph showing a change in a resonant frequency in the sensing element 10 according to an embodiment.

Referring to FIGS. 1 to 3, the sensing element 10 according to an embodiment may include a first-first electrode 11, a first-second electrode 12, and a first piezoelectric layer 13 between the first-first electrode 11 and the first-second electrode 12. According to an embodiment, the first-first electrode 11 and the first-second electrode 12 may each be provided in a flat plate shape extending in one plane (XY plane). For example, the first-first electrode 11 and the first-second electrode 12 may each extend in one plane (XY plane) with the area corresponding to a sensing area.

Also, the first-first electrode 11 and the first-second electrode 12 according to an embodiment may each be an electrode portion including a metal material. As an example, the first-first electrode 11 and the first-second electrode 12 may be disposed to face each other. In this case, the first piezoelectric layer 13 may be between the first-first electrode 11 and the first-second electrode 12.

The first piezoelectric layer 13 may be implemented in the form of a thin film, and may include zinc oxide (ZnO), aluminum nitride (AlN), quartz crystal, lead zirconate titanate (PZT), or other various types of piezoelectric materials. As an example, the resonant frequency of the sensing element 10 may be determined by the thickness of the first piezoelectric layer 13 and other design characteristics. According to an embodiment, when a radio frequency (RF) voltage corresponding to the resonant frequency is applied to the first-first electrode 11 and the first-second electrode 12, the sensing element 10 may resonate in a direction (Z direction) in which the first-first electrode 11, the first piezoelectric layer 13, and the first-second electrode 12 are stacked.

Referring to FIG. 4, the horizontal axis represents frequency, and the vertical axis represents acoustic impedance. A first graph $T_1$ indicates the resonant frequency of the sensing element 10 when no contaminants are sensed in the sensing element 10, and a second graph $T_2$ indicates the resonant frequency of the sensing element 10 when contaminants are sensed in the sensing element 10.

An FBAR element may obtain a change in a resonant frequency according to a change in a mass induced in the sensing element 10, as expressed in Equation (1) below.

$$\Delta f = -\frac{2f_0^2}{A\sqrt{\rho_q \mu_q}} \Delta m \quad (1)$$

In Equation (1), $\Delta f$ and $f_0$ represent the change in the frequency of the sensing element 10 and the resonant frequency of the sensing element 10, respectively, $\mu_q$ and $\rho_q$ represent the shear modulus of the first piezoelectric layer 13 and the density of the material of the first piezoelectric layer 13, respectively, A represents the area of a gas sensing area, and $\Delta m$ represents the changed mass. That is, according to Equation (1), the change in the frequency of the sensing element 10 may occur according to the change in the mass of the sensing element 10, for example, the change in the mass of contaminants adsorbed to the sensing element 10. As described above, when contaminants are sensed in the sensing element 10, the resonant frequency of the sensing element 10 is changed. Accordingly, an oscillation signal output from the frequency detector 20 is also changed. That is, the resonant frequency is also changed, as illustrated in FIG. 4. Therefore, contaminants may be sensed or measured by detecting the change in the resonant frequency.

Figure 5:
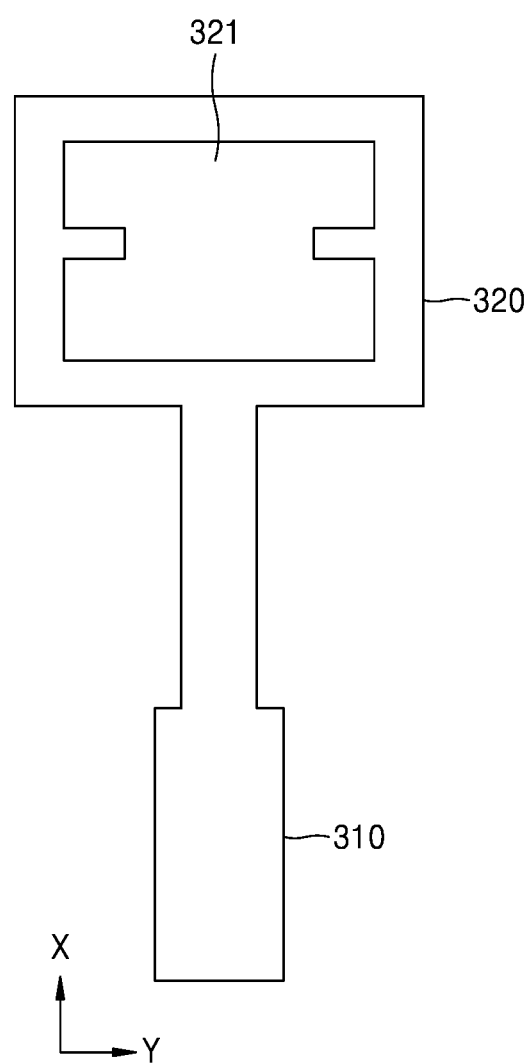
FIG. 5 is a plan view of a support structure according to an embodiment.
Figure 6:
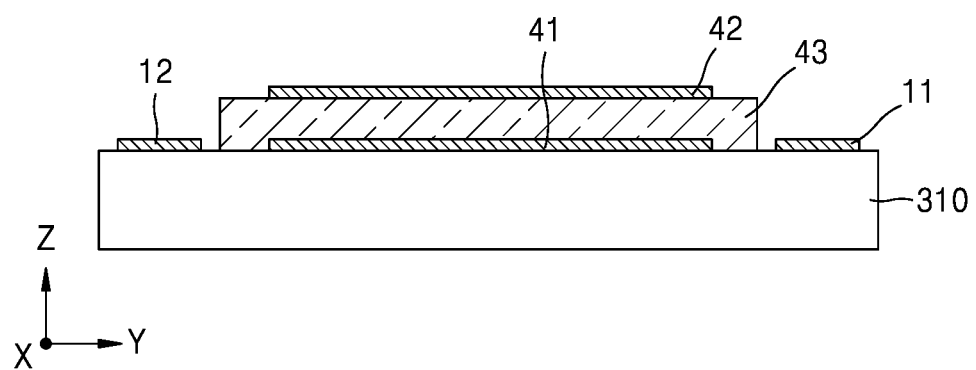
FIG. 6 is a cross-sectional view of the sensor device taken along line 6-6 of FIG. 2.

FIG. 5 is a plan view of the support structure 30 according to an embodiment. FIG. 6 is a cross-sectional view of the sensor device taken along line 6-6 of FIG. 2;

Referring to FIGS. 2, 3, and 5, the support structure 30 according to an embodiment may support the sensing element 10. As an example, the support structure 30 may include a cantilever shape extending in a first direction (X direction) and having one end 31 fixed to a base portion B. As the base portion B, any support capable of supporting and fixing one end 31 of the support structure 30 may be used. As an example, the support structure 30 and the base portion B may be integrally formed as a single body. The other end 32 of the support structure 30 may be a free end that is not constrained to another support. Accordingly, the other end 32 of the support structure 30 may be raised or lowered in a second direction (Z direction) perpendicular to the first direction (X direction).

According to an embodiment, the support structure 30 may be a semiconductor substrate including at least one of silicon, germanium, silicon germanium, gallium arsenide, and indium phosphide. However, the disclosure is not limited thereto, and the support structure 30 may include any material having a certain elastic force that allows the other end 32 thereof to be raised or lowered in the second direction (Z direction).

The support structure 30 according to an embodiment may include an actuator support 310 on which the actuator 40 is disposed and a sensing element support 320 on which the sensing element 10 is disposed. The actuator support 310 according to an embodiment may be provided in a flat plate shape extending along one plane (XY plane). As an example, the actuator 40, which will be described below, may be supported on the actuator support 310. For example, a second-first electrode 41 provided in the actuator 40, which will be described below, may be supported on the actuator support 310. In this case, a second piezoelectric layer 43 and a second-second electrode 42 may be supported on the second-first electrode 41.

According to an embodiment, a driving force may be applied in the second direction (Z direction) to the actuator support 310, via the actuator 40 supported on one end 31 of the support structure 30. At this time, because the other end 32 of the support structure 30 is a free end, the other end 32 of the support structure 30 may be raised or lowered in the second direction (Z direction). As the other end 32 of the support structure 30 is raised or lowered in the second direction (Z direction), the sensing element 10 supported on the sensing element support 320 may also be raised or lowered in the second direction (Z direction). In this case, contaminants attached to the sensing element 10 may be separated from the sensing element 10.

As an example, the sensing element support 320 may be disposed at the other end 32 of the support structure 30. In this case, the sensing element 10 may be disposed at the other end 32 of the support structure 30. Also, the actuator support 310 may be disposed at one end 31 of the support structure 30. In this case, the actuator 40 may be disposed at one end 31 of the support structure 30.

The sensing element support 320 according to an embodiment may be provided in a frame shape having an opening 321. As an example, the opening 321 may correspond to a sensing area of the sensing element 10 disposed on the sensing element support 320. For example, the sensing area of the sensing element 10 may be an area in which the first-first electrode 11, the first piezoelectric layer 13, and the first-second electrode 12 overlap each other. In this case, the opening 321 may be formed in an area disposed to overlap the first-first electrode 11, the first piezoelectric layer 13, and the first-second electrode 12.

The actuator 40 according to an embodiment may be supported by one end 31 of the support structure 30, for example, the actuator support 310. As an example, the actuator 40 may apply a driving force to the support structure 30 in the second direction (Z direction). In the disclosure, a piezoelectric actuator using a piezoelectric material is mainly described as the actuator 40 disposed at one end 31 of the support structure 30. However, the disclosure is not limited thereto. As the actuator 40, any device capable of applying a driving force to the support structure 30 in the second direction (Z direction) may be used.

The actuator 40 according to an embodiment may include a second-first electrode 41, a second-second electrode 42, and a second piezoelectric layer 43 between the second-first electrode 41 and the second-second electrode 42. The second-first electrode 41 according to an embodiment may be supported by one end 31 of the support structure 30, for example, the actuator support 310. In this case, the second-first electrode 41 and the second-second electrode 42 may be disposed to face each other. Also, in this case, the second piezoelectric layer 43 may be disposed between the second-first electrode 41 and the second-second electrode 42. The second-first electrode 41 and the second-second electrode 42 according to an embodiment may each be an electrode portion including a metal material.

The second piezoelectric layer 43 may be implemented in the form of a thin film, and may include zinc oxide (ZnO), aluminum nitride (AlN), quartz crystal, PZT, or other various types of piezoelectric materials. According to an embodiment, when an RF voltage corresponding to the resonant frequency is applied to the second-first electrode 41 and the second-second electrode 42, the actuator 40 may resonate in a direction (Z direction) in which the second-first electrode 41, the second piezoelectric layer 43, and the second-second electrode 42 are stacked. For example, the second-first electrode 41 and the second-second electrode 42 may be electrically connected to the power supply 50. In this case, when the RF voltage corresponding to the resonant frequency is applied from the power supply 50, the actuator 40 may resonate in the second direction (Z direction).

According to an embodiment, the second piezoelectric layer 43 may extend up to the first piezoelectric layer 13 included in the sensing element 10 in the first direction (X direction). As an example, the first piezoelectric layer 13 included in the sensing element 10 and the second piezoelectric layer 43 included in the actuator 40 may be integrally formed as a single body. Accordingly, the manufacturing convenience of the sensing element 10 and the actuator 40 may be improved. However, the disclosure is not limited thereto. Of course, the first piezoelectric layer 13 and the second piezoelectric layer 43 may be formed separately from each other.

Figure 7:
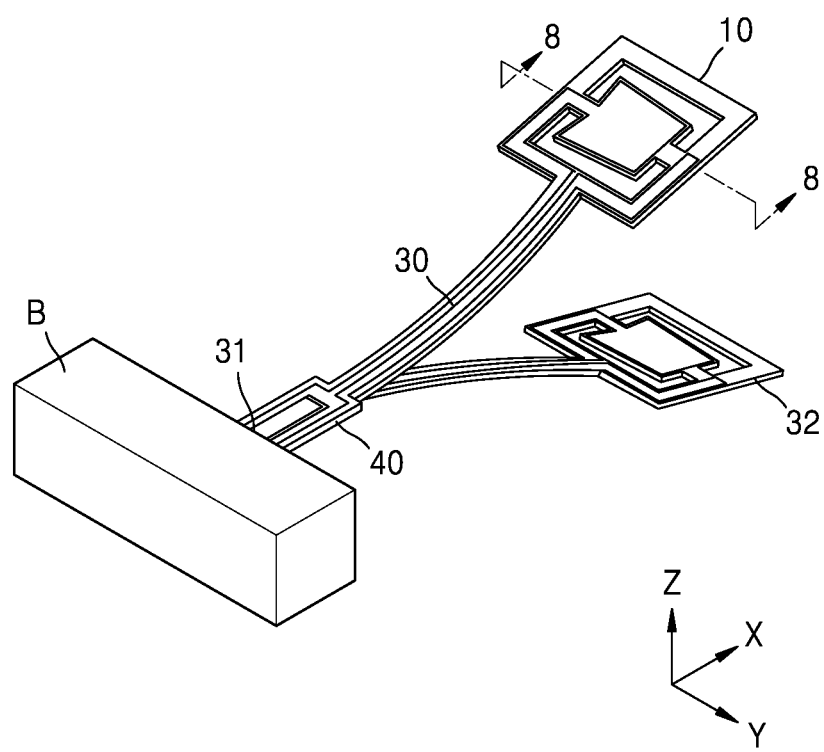
FIG. 7 is a perspective view of a sensor device according to an embodiment.
Figure 8:
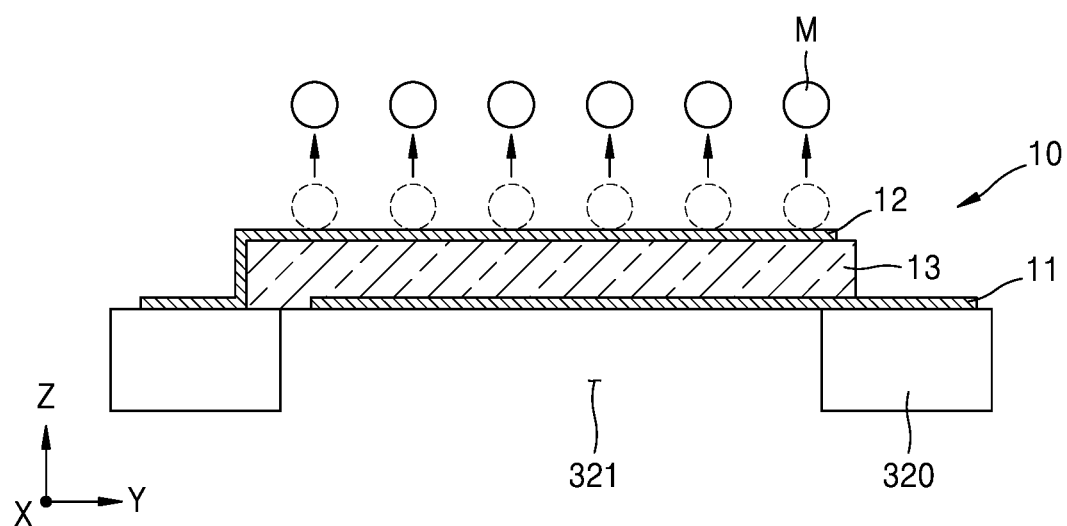
FIG. 8 is a cross-sectional view of the sensor device taken along line 8-8 of FIG. 7.

FIG. 7 is a perspective view of the sensor device according to an embodiment. FIG. 8 is a cross-sectional view of the sensor device taken along line C-C of FIG. 7.

Referring to FIGS. 1, 7, and 8, the controller 60 according to an embodiment may operate the actuator 40 by controlling the power supply 50 according to a change in the resonant frequency of the sensing element 10, which is received from the frequency detector 20. As an example, the frequency detector 20 may output the second graph $T_2$ having the resonant frequency generated when contaminants are sensed in the sensing element 10, as illustrated in FIG. 4. At this time, the controller 60 may operate the actuator 40 by controlling the power supply 50.

As an example, the power supply 50 receiving a control signal from the controller 60 may apply, to the second-first electrode 41 and the second-second electrode 42 included in the actuator 40, the RF voltage corresponding to the resonant frequency. Accordingly, the actuator 40 may resonate in the second direction (Z direction). Consequently, a driving force may be applied to one end 31 of the support structure 30, at which the actuator 40 is disposed, in the second direction (Z direction). At this time, because the other end 32 of the support structure 30 is a free end, the other end 32 of the support structure 30 may be raised or lowered in the second direction (Z direction). As the other end 32 of the support structure 30 is raised or lowered in the second direction (Z direction), the sensing element 10 supported by the sensing element support 320 may also be raised or lowered in the second direction (Z direction). In this case, contaminants M attached to the sensing element 10 may be separated from the sensing element 10.

Figure 9:
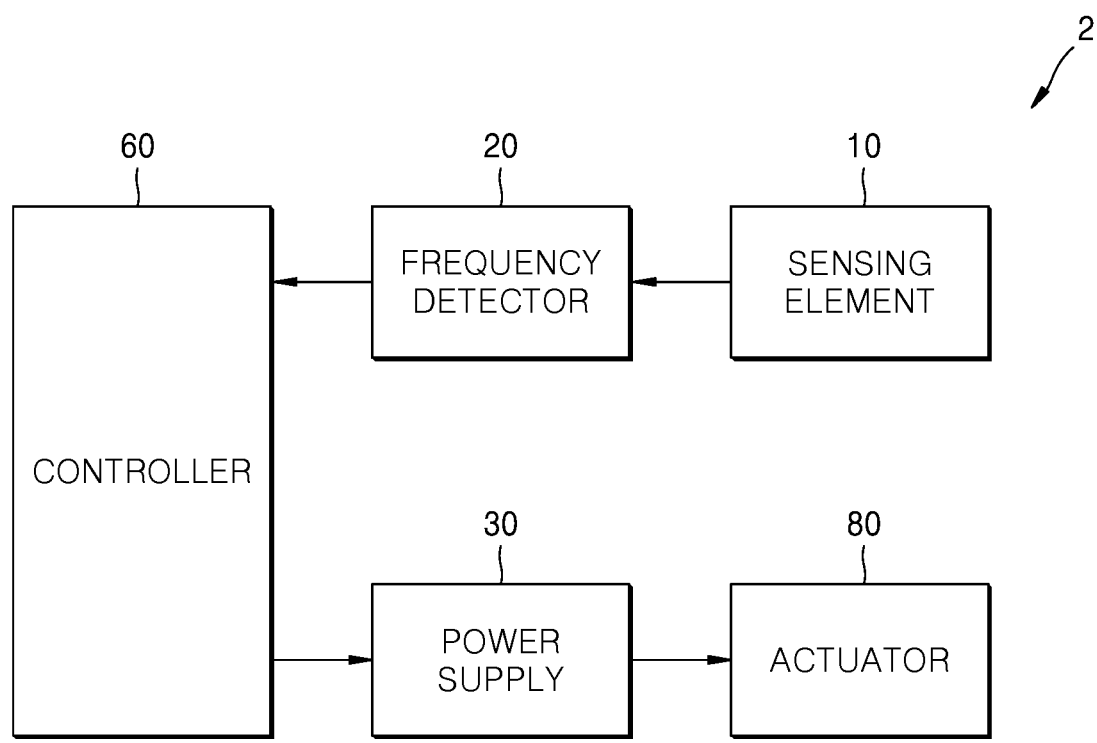
FIG. 9 is a block diagram of a sensor device according to an embodiment.
Figure 10:
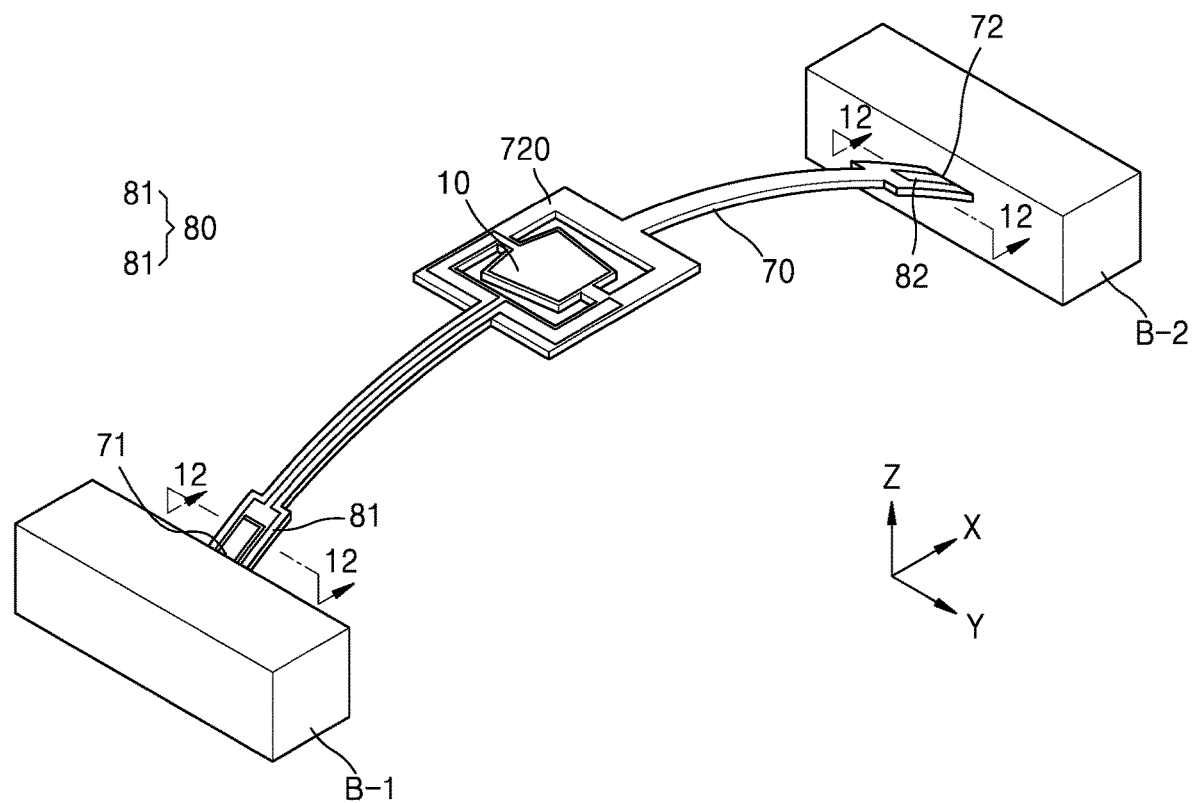
FIG. 10 is a perspective view of a sensor device according to an embodiment.
Figure 11:
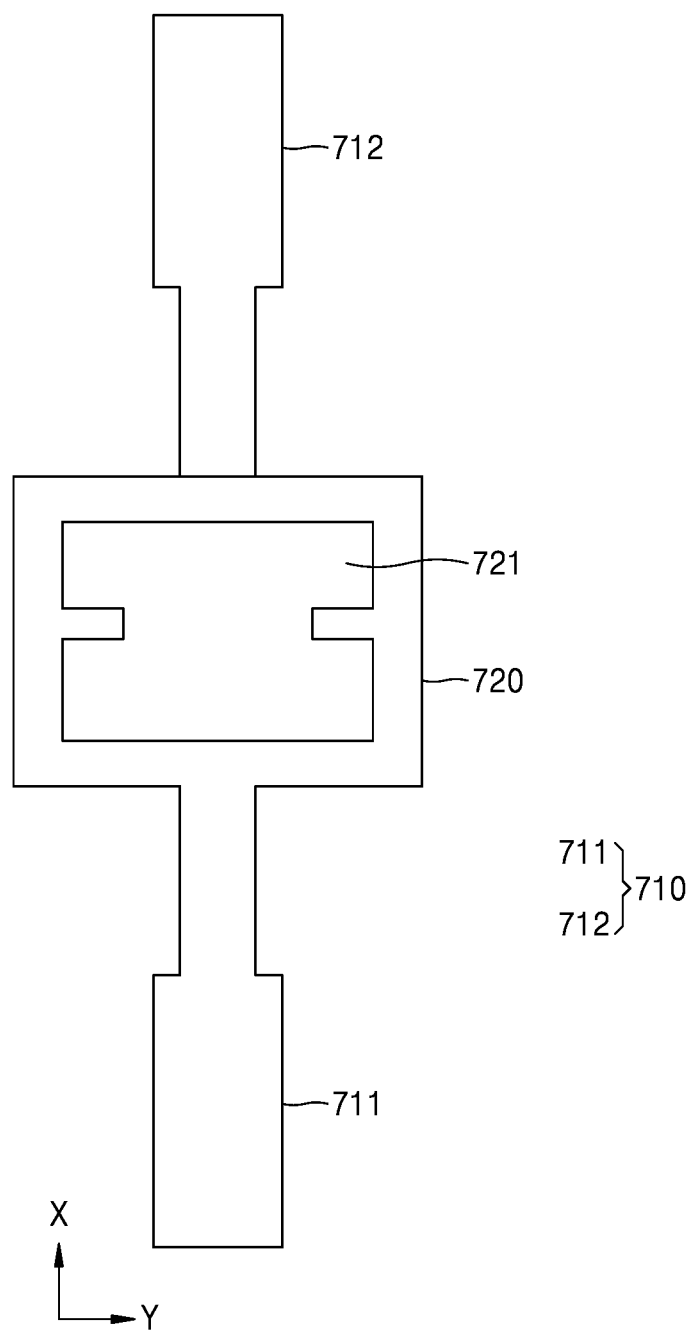
FIG. 11 is a plan view of a support structure according to an embodiment.
Figure 12:
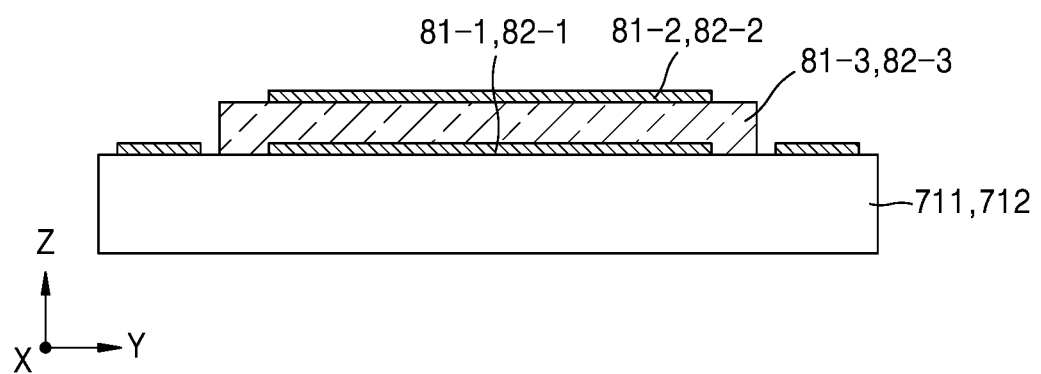
FIG. 12 is a cross-sectional view of the sensor device taken along line 12-12 of FIG. 10.

FIG. 9 is a block diagram of a sensor device 2 according to an embodiment. FIG. 10 is a perspective view of the sensor device 2 according to an embodiment. FIG. 11 is a plan view of a support structure according to an embodiment. FIG. 12 is a cross-sectional view of the sensor device 2 taken along line 12-12 of FIG. 10. The cross-sectional views correspond to similar structural arrangements at two ends of the beam support.

Referring to FIGS. 9 to 12, the sensor device 2 according to an embodiment may include a sensing element 10 configured to adsorb and sense contaminants, a frequency detector 20 configured to detect a resonant frequency of the sensing element 10, a support structure 70 configured to support the sensing element 10, an actuator 80 configured to apply a driving force to the support structure 70, a power supply 50 configured to apply a certain voltage to the actuator 80, and a controller 60. Because configurations other than the support structure 70 and the actuator 80 are substantially the same as those illustrated in FIGS. 2 to 8, detailed descriptions thereof are omitted.

The support structure 70 according to an embodiment may support the sensing element 10. As an example, the support structure 70 may extend in the first direction (X direction). In this case, the support structure 70 may have a double clamped beam shape in which a first end 71 of the support structure 70 is fixed to a first base portion B-1 and a second end 72 of the support structure 70 is fixed to a second base portion B-2. The first base portion B-1 and the second base portion B-2 may be any supports that are spaced apart from each other by a certain distance in the first direction (X direction) and support and fix the first end 71 of the support structure 70 and the second end 72 of the support structure 70, respectively. As an example, the support structure 70, the first base portion B-1, and the second base portion B-2 may be integrally formed as a single body.

The first end 71 and the second end 72 of the support structure 70 according to an embodiment may be fixed ends constrained to different supports from each other. Accordingly, when a driving force is applied from the actuator 80, an area between the first end 71 and the second end 72 of the support structure 70 may be raised or lowered in the second direction (Z direction) perpendicular to the first direction (X direction). As an example, the sensing element 10 may be disposed between the first end 71 and the second end 72 of the support structure 70. Accordingly, the sensing element 10 disposed between the first end 71 and the second end 72 of the support structure 70 may also be raised or lowered in the second direction (Z direction).

According to an embodiment, the support structure 70 may be a semiconductor substrate including at least one of silicon, germanium, silicon germanium, gallium arsenide, and indium phosphide. However, the disclosure is not limited thereto, and the support structure 70 may include any material having a certain elastic force that allows the area between the first end 71 and the second end 72 of the support structure 70 to be raised or lowered in the second direction (Z direction).

The support structure 70 according to an embodiment may include an actuator support 710 on which the actuator 80 is disposed and a sensing element support 720 on which the sensing element 10 is disposed. The actuator support 710 according to an embodiment may be disposed at the first end 71 and/or the second end 72 of the support structure 70. As an example, the actuator support 710 may include a first actuator support 711 disposed at the first end 71 of the support structure 70 and a second actuator support 712 disposed at the second end 72 of the support structure 70.

Also, the actuator support 710 according to an embodiment may be provided in a flat plate shape extending along one plane (XY plane). As an example, one or more actuators 80, which will be described below, may be supported on the actuator support 710. According to an embodiment, a driving force may be applied to an area between the first end 71 and the second end 72 of the support structure 70 in the second direction (Z direction) by the actuator 80 supported on the actuator support 710, that is, the first end 71 or the second end 72 of the support structure 70. As the area between the first end 71 and the second end 72 of the support structure 70 is raised or lowered in the second direction (Z direction), the sensing element 10 supported by the sensing element support 720 may also be raised or lowered in the second direction (Z direction). In this case, contaminants attached to the sensing element 10 may be separated from the sensing element 10.

As an example, the sensing element support 720 may be disposed between the first end 71 and the second end 72 of the support structure 70. In this case, the sensing element 10 may be supported by the sensing element support 720 disposed between the first end 71 and the second end 72 of the support structure 70. In this case, the actuator 80 may be disposed at the first end 71 and/or the second end 72 of the support structure 70.

The sensing element support 720 according to an embodiment may be provided in a frame shape having an opening 721. As an example, the opening 721 may correspond to a sensing area of the sensing element 10 disposed on the sensing element support 720. For example, the sensing area of the sensing element 10 may be an area in which the first-first electrode 11, the first piezoelectric layer 13, and the first-second electrode 12 overlap each other. In this case, the opening 721 may be formed in an area disposed to overlap the first-first electrode 11, the first piezoelectric layer 13, and the first-second electrode 12.

The actuator 80 according to an embodiment may be disposed at the first end 71 and/or the second end 72 of structure 70. For example, the actuator 80 may include a first actuator 81 and a second actuator 82 respectively disposed at the first end 71 and the second end 72 of the support structure 70. As an example, the actuator 80 may apply a driving force to move the area between the first end 71 and the second end 72 of the support structure 70 in the second direction (Z direction). In the disclosure, piezoelectric actuators using a piezoelectric material are mainly described as the first actuator 81 and the second actuator 82 respectively disposed at the first end 71 and the second end 72 of the support structure 70. However, the disclosure is not limited thereto. As the actuator 80, any device capable of applying a driving force to an area between the first end 71 and the second end 72 of the support structure 70 in the second direction (Z direction) may be used.

The first actuator 81 according to an embodiment may include a second-11$^{th}$ electrode 81-1, a second-12$^{th}$ electrode 81-2, and a second-first piezoelectric layer 81-3 between the second-11$^{th}$ electrode 81-1 and the second-12$^{th}$ electrode 81-2. The second-11$^{th}$ electrode 81-1 according to an embodiment may be supported by the first end 71 of the support structure 70, for example, the first actuator support 711. In this case, the second-11$^{th}$ electrode 81-1 and the second-12$^{th}$ electrode 81-2 may be disposed to face each other. Also, in this case, the second-first piezoelectric layer 81-3 may be disposed between the second-11$^{th}$ electrode 81-1 and the second-12$^{th}$ electrode 81-2. The second-11$^{th}$ electrode 81-1 and the second-12$^{th}$ electrode 81-2 according to an embodiment may each be an electrode portion including a metal material.

The second-first piezoelectric layer 81-3 may be implemented in the form of a thin film, and may include zinc oxide (ZnO), aluminum nitride (AlN), quartz crystal, PZT, or other various types of piezoelectric materials. According to an embodiment, when an RF voltage corresponding to the resonant frequency is applied to the second-11$^{th}$ electrode 81-1 and the second-12$^{th}$ electrode 81-2, the first actuator 81 may resonate in a direction (Z direction) in which the second-11$^{th}$ electrode 81-1, the second-first piezoelectric layer 81-3, and the second-12$^{th}$ electrode 81-2 are stacked. For example, the second-11$^{th}$ electrode 81-1 and the second-12$^{th}$ electrode 81-2 may be electrically connected to the power supply 50. In this case, when the RF voltage corresponding to the resonant frequency is applied from the power supply 50, the first actuator 81 may resonate in the second direction (Z direction).

The second actuator 82 according to an embodiment may include a second-21$^{st}$ electrode 82-1, a second-22$^{nd}$ electrode 82-2, and a second-second piezoelectric layer 82-3 between the second-21$^{st}$ electrode 82-1 and the second-22$^{nd}$ electrode 82-2. The second-21$^{st}$ electrode 82-1 according to an embodiment may be supported by the second end 72 of the support structure 70, for example, the second actuator support 712. Because configurations of the second actuator 82 are substantially the same as those of the first actuator 81 except for the arrangement position, detailed descriptions thereof are omitted.

According to an embodiment, the second-first piezoelectric layer 81-3 and the second-second piezoelectric layer 82-3 may each extend up to the first piezoelectric layer 13 included in the sensing element 10 in the first direction (X direction). As an example, the first piezoelectric layer 13 included in the sensing element 10 and the second-first piezoelectric layer 81-3 and the second-second piezoelectric layer 82-3 respectively included in the first actuator 81 and the second actuator 82 may be integrally formed as a single body. Accordingly, the manufacturing convenience of the sensing element 10 and the actuator 80 may be improved. However, the disclosure is not limited thereto. Of course, the first piezoelectric layer 13, the second-first piezoelectric layer 81-3, and the second-second piezoelectric layer 82-3 may be formed separately from each other.

Figure 13:
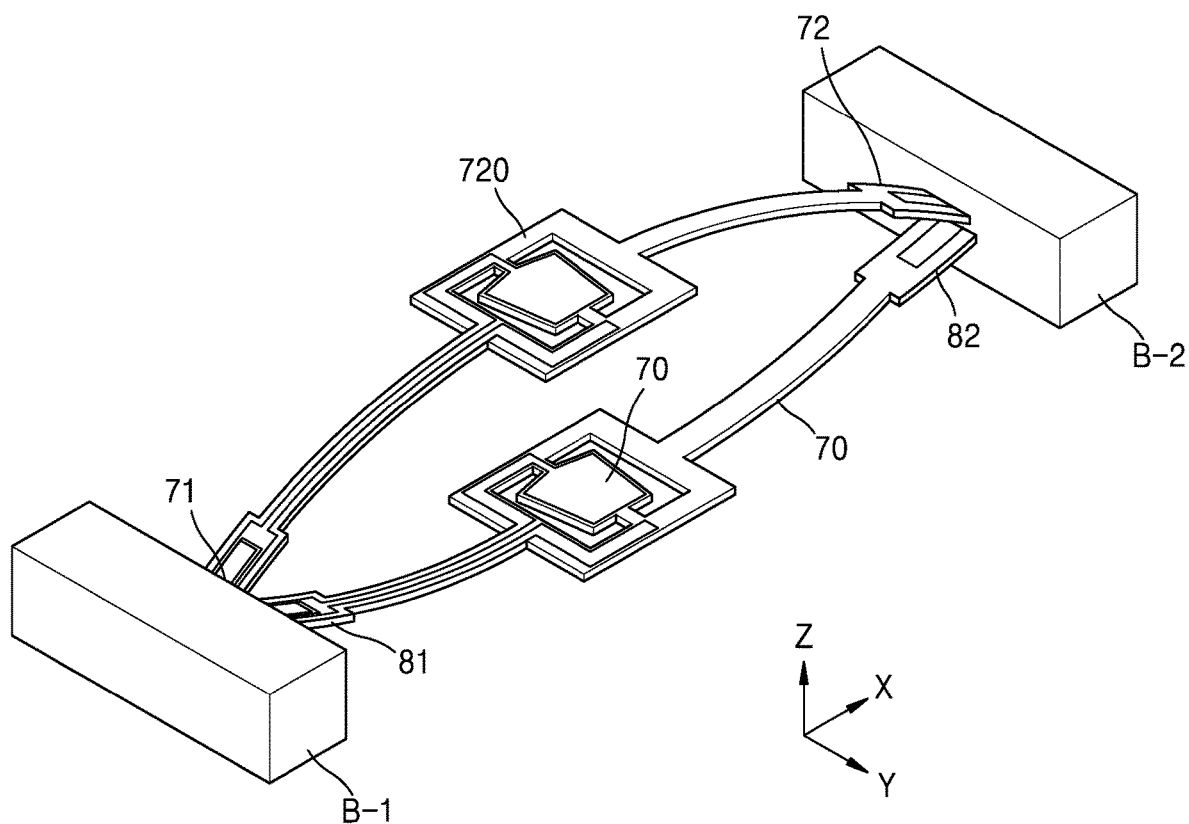
FIG. 13 is a perspective view of a sensor device according to an embodiment.

FIG. 13 is a perspective view of the sensor device according to an embodiment.

Referring to FIGS. 9 and 13, the controller 60 according to an embodiment may operate the actuator 80 by controlling the power supply 50 according to a change in the resonant frequency of the sensing element 10, which is received from the frequency detector 20. As an example, the second graph $T_2$ having the resonant frequency generated when contaminants are sensed in the sensing element 10 may be output from the frequency detector 20, as illustrated in FIG. 4. At this time, the controller 60 may operate the actuator 80 by controlling the power supply 50.

As an example, the power supply 50 receiving the control signal from the controller 60 may apply, to the second-11$^{th}$ electrode 81-1 and the second-12$^{th}$ electrode 81-2, and the second-21$^{st}$ electrode 82-1 and the second-22$^{nd}$ electrode 82-2 included in the first actuator 81 and the second actuator 82, the RF voltage corresponding to the resonant frequency. Accordingly, as illustrated in FIG. 13, the first actuator 81 and the second actuator 82 may each resonate in the second direction (Z direction). Therefore, a driving force may be applied to the first end 71 and the second end 72 of the support structure 70, at which the first actuator 81 and the second actuator 82 are respectively disposed, in the second direction (Z direction). In this case, an area between the first end 71 and the second end 72 of the support structure 70 may be raised or lowered in the second direction (Z direction). As the area between the first end 71 and the second end 72 of the support structure 70 is raised or lowered in the second direction (Z direction), the sensing element 10 supported by the sensing element support 720 may also be raised or lowered in the second direction (Z direction). In this case, contaminants attached to the sensing element 10 may be separated from the sensing element 10.

Figure 14:
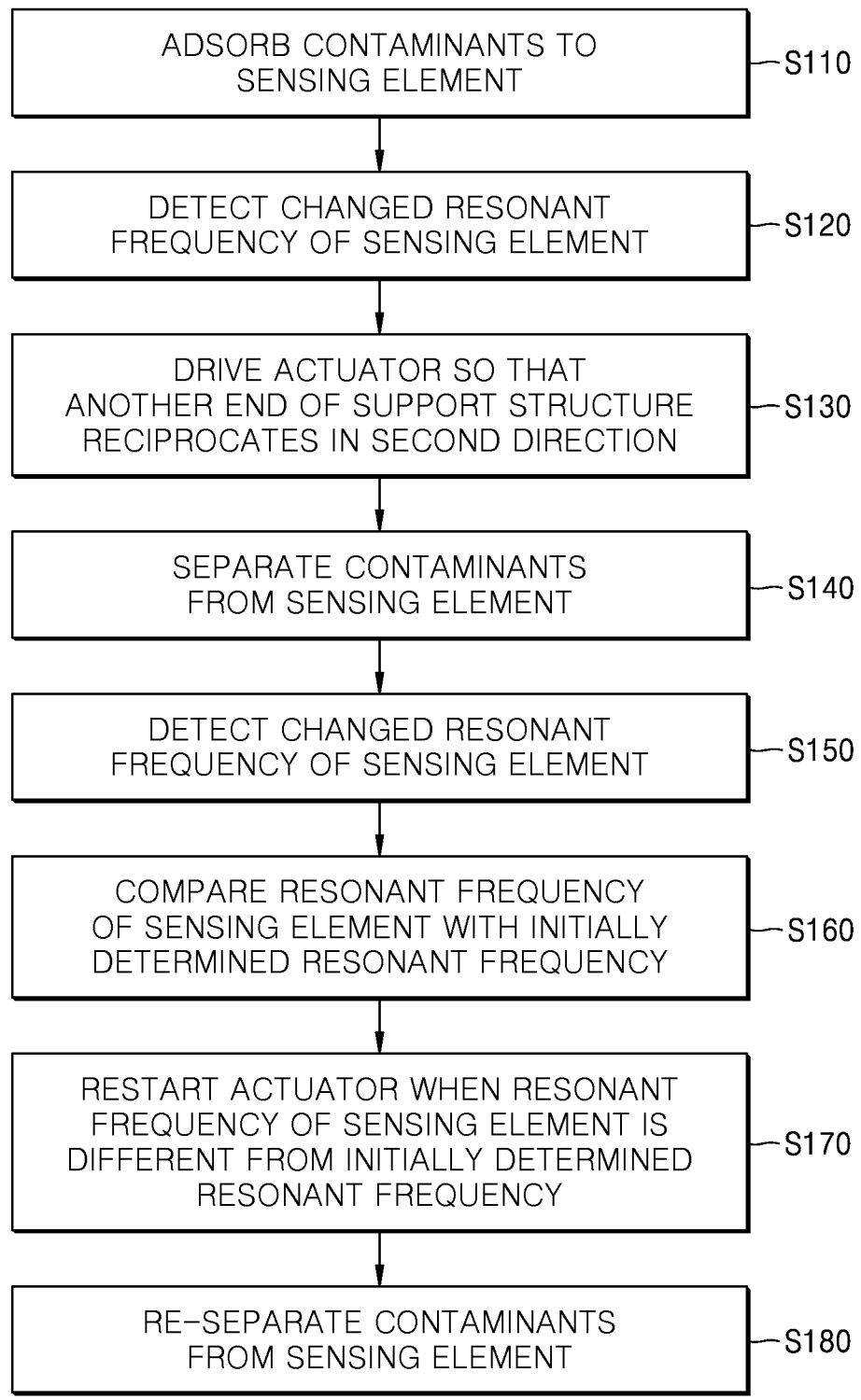
FIG. 14 is a flowchart of an operating method of a sensor device, according to an embodiment.

FIG. 14 is a flowchart of an operating method of a sensor device, according to an embodiment.

Referring to FIG. 14, the operating method of the sensor device 1, according to an embodiment, may include adsorbing contaminants to the sensing element 10 (S110). As an example, as illustrated in FIG. 2, air containing contaminants may be introduced, and the contaminants may be adsorbed to the sensing element 10.

A changed resonant frequency of the sensing element 10 may be detected (S120). As an example, when the contaminants are adsorbed to the sensing element 10, the frequency detector 20 may detect an output signal based on the changed resonant frequency. For example, the frequency detector 20 may output the second graph $T_2$ having the resonant frequency generated when the contaminants are sensed in the sensing element 10, as illustrated in FIG. 4.

The actuator 40 may be driven so that the support structure 30 reciprocates in the second direction (Z direction) (S130). When the changed resonant frequency of the sensing element 10 is detected, the controller 60 may control the power supply 50 to operate the actuator 40. As an example, the power supply 50 receiving the control signal from the controller 60 may apply, to the second-first electrode 41 and the second-second electrode 42 included in the actuator 40, the RF voltage corresponding to the resonant frequency. Accordingly, the actuator 40 may resonate in the second direction (Z direction). Consequently, a driving force may be applied to one end 31 of the support structure 30, at which the actuator 40 is disposed, in the second direction (Z direction). Accordingly, as illustrated in FIG. 7, a reciprocating motion in which the other end 32 of the support structure 30 is raised or lowered in the second direction (Z direction) may be performed.

The contaminants may be separated from the sensing element 10 (S140). As the reciprocating motion in which the other end 32 of the support structure 30 is raised or lowered in the second direction (Z direction) is performed as illustrated in FIG. 7, the contaminants M attached to the sensing element 10 may be separated from the sensing element 10.

A changed resonant frequency of the sensing element 10 may be detected (S150). As an example, when the contaminants are separated from the sensing element 10, the frequency detector 20 may detect an output signal based on the changed resonant frequency. For example, when the contaminants are not detected in the sensing element 10 from the second graph $T_2$ having the resonant frequency generated when the contaminants are sensed in the sensing element 10, as illustrated in FIG. 4, the frequency detector 20 may re-sense the output signal changed to the first graph $T_1$ indicating an initial resonant frequency of the sensing element 10.

The resonant frequency of the sensing element 10 may be compared with an initially determined resonant frequency (S160). According to an embodiment, when the contaminants are not detected in the sensing element 10 from the second graph $T_2$ having the resonant frequency generated when the contaminants are sensed in the sensing element 10 from the output signal received from the frequency detector 20, the controller 60 may compare whether the change is completed up to the first graph $T_1$ indicating the initial resonant frequency of the sensing element 10.

When the resonant frequency of the sensing element 10 is different from the initially determined resonant frequency, the actuator 40 may be restarted (S170). According to an embodiment, when the resonant frequency of the sensing element 10 does not change up to the initially determined resonant frequency, the controller 60 may determine that the contaminants are not completely separated from the sensing element 10. In this case, the controller 60 may control the power supply 50 to restart the actuator 40. In this way, the level of contaminants on the sensing element starts moving from a contaminant level of $T_2$ towards $T_1$ corresponding to a level where the amount of contaminants corresponds to the initial resonant frequency where contaminants do not need to be removed from the surface of the sensing element.

The contaminants may be re-separated from the sensing element 10 (S180). According to an embodiment, the actuator 40 may resonate in the second direction (Z direction). Consequently, a driving force may be applied to one end 31 of the support structure 30, at which the actuator 40 is disposed, in the second direction (Z direction). Accordingly, as illustrated in FIG. 7, a reciprocating motion in which the other end 32 of the support structure 30 is raised or lowered in the second direction (Z direction) may be performed. As the reciprocating motion in which the other end 32 of the support structure 30 is raised or lowered in the second direction (Z direction) is performed, the contaminants M attached to the sensing element 10 may be re-separated from the sensing element 10.

The sensor device according to an embodiment may reuse the sensing element by removing fine contaminants attached to the sensing element.

The sensor device according to an embodiment may use the actuator to easily remove fine contaminants attached to the sensing element. Therefore, the accuracy of the sensing element that detects fine contaminants in the reuse process may be improved.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. A sensor device comprising:
   a support structure having a cantilever shape extending in a first direction and having a first end fixed;
   a sensing element having a surface and having a resonant frequency which changes according to contaminants adsorbed to the surface, the sensing element being disposed at a second end of the support structure opposite to the first end;
   a frequency detector configured to detect the resonant frequency of the sensing element; and
   an actuator disposed at the first end of the support structure, wherein the actuator moves the support structure so that the second end of the support structure moves in a second direction perpendicular to the first direction.

2. The sensor device of claim 1, wherein the sensing element comprises at least one of a film bulk acoustic resonator (FBAR) element, a surface acoustic wave (SAW) element, and a quartz crystal microbalance (QCM) element, a resonant frequency of which changes according to adsorption of the contaminants.

3. The sensor device of claim 1, wherein the sensing element comprises:
   a first-first electrode having a flat plate shape;
   a first-second electrode having a flat plate shape; and
   a first piezoelectric layer disposed between the first-first electrode and the first-second electrode.

4. The sensor device of claim 3, wherein the sensor device has a sensing area in which the first-first electrode, the first piezoelectric layer, and the first-second electrode are disposed to overlap each other, and
   the support structure comprises a sensing element support having a frame shape having an opening in an area corresponding to the sensing area.

5. The sensor device of claim 3, wherein the actuator comprises:
   a second-first electrode supported by an actuator support provided in the support structure;
   a second-second electrode disposed to face the second-first electrode; and
   a second piezoelectric layer disposed between the second-first electrode and the second-second electrode.

6. The sensor device of claim 5, wherein the first piezoelectric layer and the second piezoelectric layer are integrally formed as a single body.

7. The sensor device of claim 5, further comprising a power supply configured to apply a voltage to the second-second electrode and the second-first electrode.

8. The sensor device of claim 7, further comprising a controller configured to control the power supply to supply voltage to the second-second electrode and the second-first electrode according to a change in the resonant frequency received from the frequency detector.

9. The sensor device of claim 1, wherein the support structure is a semiconductor substrate comprising at least one of silicon, germanium, silicon germanium, gallium arsenide, and indium phosphide.

10. A sensor device comprising:
    a support structure having a double clamped beam shape extending in a first direction and having a first end and a second end fixed;
    a sensing element disposed between the first end and the second end of the support structure, the sensing element having a surface and having a resonant frequency changing according to contaminants adsorbed to the surface;
    a frequency detector configured to detect the resonant frequency of the sensing element; and
    an actuator disposed at at least one of: the first end and the second end of the support structure and configured to move the support structure so that an area between the first end and the second end of the support structure moves in a second direction perpendicular to the first direction.

11. The sensor device of claim 10, wherein the sensing element comprises at least one of a film bulk acoustic resonator (FBAR) element, a surface acoustic wave (SAW) element, and a quartz crystal microbalance (QCM) element, a resonant frequency of which changes according to adsorption of the contaminants.

12. The sensor device of claim 10, wherein the sensing element comprises:
    a first-first electrode having a flat plate shape;
    a first-second electrode having a flat plate shape; and a first piezoelectric layer disposed between the first-first electrode and the first-second electrode.

13. The sensor device of claim 12, wherein the sensor device has a sensing area in which the first-first electrode, the first piezoelectric layer, and the first-second electrode are disposed to overlap each other, and the support structure comprises a sensing element support having a frame shape having an opening disposed in an area corresponding to the sensing area.

14. The sensor device of claim 12, wherein the actuator comprises a first actuator and a second actuator respectively disposed at the first end and the second end, the first actuator comprises:
a second-$11^{th}$ electrode supported by a first actuator support provided in the support structure;
a second-$12^{th}$ electrode disposed to face the second-$11^{th}$ electrode; and
a second-first piezoelectric layer disposed between the second-$11^{th}$ electrode and the second-$12^{th}$ electrode, and the second actuator comprises:
a second-$21^{st}$ electrode supported by a second actuator support provided in the support structure;
a second-$22^{nd}$ electrode disposed to face the second-$21^{st}$ electrode; and
a second-second piezoelectric layer disposed between the second-$21^{st}$ electrode and the second-$22^{nd}$ electrode.

15. The sensor device of claim 14, wherein the first piezoelectric layer, the second-first piezoelectric layer, and the second-second piezoelectric layer are integrally formed as a single body.

16. The sensor device of claim 14, wherein the actuator further comprises a power supply configured to apply voltage to the second-$12^{th}$ electrode, the second-$11^{th}$ electrode, the second-$22^{nd}$ electrode and the second-$21^{st}$ electrode.

17. The sensor device of claim 16, further comprising a controller configured to control the power supply according to a change in the resonant frequency received from the frequency detector.

18. The sensor device of claim 10, wherein the support structure is a semiconductor substrate comprising at least one of silicon, germanium, silicon germanium, gallium arsenide, and indium phosphide.

19. An operating method of the sensor device of claim 1, the operating method comprising:
adsorbing the contaminants to the sensing element;
detecting a resonant frequency of the sensing element;
driving the actuator so that the support structure reciprocates in the second direction; and
separating the contaminants from the sensing element.

20. The operating method of claim 19, further comprising:
re-detecting the resonant frequency of the sensing element;
comparing the resonant frequency of the sensing element with an initial resonant frequency:
restarting the actuator when the re-detected resonant frequency of the sensing element is not at a level of the initial resonant frequency; and
re-separating the contaminants from the sensing element when the re-detected resonant frequency has not reached the level of the initial resonant frequency.

* * * * *